United States Patent
Lin et al.

(10) Patent No.: US 8,628,254 B2
(45) Date of Patent: Jan. 14, 2014

(54) OPTICAL FIBER ADAPTER WITH SHUTTER MEMBER

(75) Inventors: Sung An Lin, Miaoli County (TW); Sung Chi Lin, Miaoli County (TW)

(73) Assignee: Ezontek Technologies Co., Ltd., Xinzhuang (TW)

(*) Notice: Subject to any disclaimer, the term of this patent is extended or adjusted under 35 U.S.C. 154(b) by 119 days.

(21) Appl. No.: 13/422,025

(22) Filed: Mar. 16, 2012

(65) Prior Publication Data

US 2013/0084041 A1 Apr. 4, 2013

(30) Foreign Application Priority Data

Sep. 30, 2011 (TW) .............................. 100135435 A

(51) Int. Cl.
G02B 6/38 (2006.01)
G02B 6/36 (2006.01)

(52) U.S. Cl.
USPC ................... 385/70; 385/55; 385/58; 385/75; 385/76

(58) Field of Classification Search
None
See application file for complete search history.

(56) References Cited

U.S. PATENT DOCUMENTS

| | | | |
|---|---|---|---|
| 6,688,780 B2* | 2/2004 | Duran .............................. | 385/76 |
| 6,866,424 B2* | 3/2005 | Tanaka et al. .................... | 385/55 |
| 7,837,395 B2* | 11/2010 | Lin et al. .......................... | 385/58 |
| 2003/0147597 A1* | 8/2003 | Duran .............................. | 385/76 |
| 2004/0062486 A1* | 4/2004 | Tanaka et al. .................... | 385/55 |
| 2004/0223701 A1* | 11/2004 | Tanaka et al. .................... | 385/55 |
| 2007/0098330 A1* | 5/2007 | Ozawa et al. .................... | 385/76 |
| 2009/0046981 A1* | 2/2009 | Margolin et al. ................ | 385/70 |
| 2009/0226141 A1* | 9/2009 | Lin et al. ......................... | 385/134 |
| 2012/0033918 A1* | 2/2012 | Jibiki et al. ...................... | 385/75 |
| 2012/0195555 A1* | 8/2012 | Jibiki et al. ...................... | 385/75 |
| 2012/0321266 A1* | 12/2012 | Lin et al. ......................... | 385/134 |
| 2013/0064517 A1* | 3/2013 | Lin et al. ......................... | 385/134 |
| 2013/0084041 A1* | 4/2013 | Lin et al. ......................... | 385/56 |

* cited by examiner

*Primary Examiner* — Rhonda Peace

(57) ABSTRACT

An optical fiber adapter includes a first housing and an elastic shutter member. The first housing includes a flange and an accommodation room with an opening. A hollow cylinder extends from the front surface of the flange and is positioned within the accommodation room. The shutter member includes a horizontal portion, two vertical portions, two hooks, a shutter plate and a connecting portion. The horizontal portion is positioned within the accommodation room. The two vertical portions extend from two opposing sides of the horizontal portion, respectively, and go through the openings on the flange, respectively. The two hooks extend from the two vertical portions, respectively, and are configured to hook on to the flange. The connecting portion connects the horizontal portion with the shutter plate. The shutter plate extends from the connecting portion and into the accommodation room to arrive in front of an opening of the hollow cylinder.

10 Claims, 7 Drawing Sheets

OPTICAL FIBER ADAPTER WITH SHUTTER MEMBER

CROSS REFERENCE TO RELATED APPLICATION

This application claims the priority benefit of Taiwan Patent Application Serial Number 100135435 filed Sep. 30, 2011, the full disclosure of which is incorporated herein by reference.

BACKGROUND OF THE INVENTION

1. Field of the Invention

The present invention relates to an optical fiber adapter, and more particularly, to an optical fiber adapter with a shutter member.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Referring to FIG. 1, a conventional fiber adapter 100 includes a housing 110 having a plurality of side walls 160. The side walls 160 define a receiving recess 120. One of the side walls 160 is provided with a slot 130 for mating with the key 192 of the connector 190 when the connector 190 is inserted into the receiving recess 120. In addition, the outer surfaces of two opposite side walls 160 are provided with recesses 140 that a clip (not shown in the figure) can be disposed thereon to facilitate the adapter 100 to be mounted on a panel.

In general, the adapter 100 further has another set of side walls 160 that defines another receiving recess 120. The two receiving recesses 120 are opposite and can respectively receive a connector 190. Of course, the two receiving recesses 120 of the adapter 100 can be designed to mate with two different types of connectors. The fiber connector 190 is always attached to one end of a fiber cable 194 and a light beam can propagate down the fiber cable 194 and emit from the ferrule 196 of the connector 190. Likewise, a light beam can be coupled into the fiber cable 194 from the end face of the ferrule 196.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the fiber cable 194 of a connector 190 through the interface between the two ferrules 196 and then reach the fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120. If the emitted light beam is high power and not obstructed, a lasting exposure to such light beam is harmful to people, particularly to the eyes. Thus, to avoid exposing to the high-power light beam, it is common to use a cap 180 to block up the unused receiving recess 120. This can obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Referring to FIG. 2, a conventional fiber adapter 200 is generally the same as the adapter 100 but further includes a cover 250 pivotally connected to the housing 110. The cover 250 covers the receiving recess 120 in its closed position. A spring 260 can force the cover 250 to be pivoted to its closed position when the receiving recess 120 is not mated with a connector 190. Thus, the cover 250 is capable of obstructing the light beam emitted from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Referring to FIG. 3, a conventional protection cap 300 for the fiber adapter 100 includes a hollow housing 310 with two opposing openings and a cover 350 pivotally connected to the housing 310. The cover 350 is pivoted to cover one of the two openings through a spring 360. The protection cap 300 can be put on the adapter 100 and cover the outer surfaces of the side walls 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitted from the receiving recess 120. However, the structure of the protection cap 300 is somewhat complex and therefore it is not inexpensive. The introduction of the protection cap 300 to obstruct the light beam will cost much.

Accordingly, there exists a need to provide a solution to solve the aforesaid problems.

SUMMARY OF THE INVENTION

The present disclosure provides a shutter member for an optical fiber adapter that may obstruct the light beams emitted from the accommodation room thereby preventing the eyes from exposure to the light beams.

In one embodiment, the optical fiber adapter of the present disclosure includes a first housing and an elastic shutter member. The first housing includes a flange having a front surface, a back surface and two openings extending through the flange from the front surface to the back surface. A first wall, a second wall, a third wall and a fourth wall extend from the front surface of the flange, wherein the first wall faces the third wall and connects with the second and fourth walls. An accommodation room with an opening is defined by the first, second, third and fourth walls. A hollow cylinder extends from the front surface of the flange and is positioned within the accommodation room. The shutter member includes a horizontal portion, two vertical portions, two hooks, a shutter plate and a connecting portion. The horizontal portion is positioned within the accommodation room and on the third wall. The two vertical portions extend from two opposing sides of the horizontal portion, respectively and go through the openings on the flange, respectively. The two hooks extend from the two vertical portions, respectively and are configured to hook on to the flange. The connecting portion connects the horizontal portion with the shutter plate. The shutter plate extends from the connecting portion and into the accommodation room to arrive in front of an opening of the hollow cylinder.

According to the present disclosure, wherein two indentations are formed on the back surface of the flange. The hooks are configured to hook on to the indentations, respectively.

According to the present disclosure, wherein the hooks are plate-like.

According to the present disclosure, wherein the elastic shutter member further comprises another hook extending from the connecting portion to hook on to the third wall.

According to the present disclosure, wherein an indentation is formed on the third wall. The elastic shutter member further comprises another hook extending from the connecting portion to hook on to the indentation of the third wall.

According to the present disclosure, wherein the first housing is integrally formed.

According to the present disclosure, wherein further comprising a second housing having a flange, a hollow cylinder extending from a front surface of the flange, and a plurality of walls extending from the front surface of the flange and surrounding the hollow cylinder. The back surface of the flange of the second housing is attached to the back surface of the flange of the first housing.

According to the present disclosure, wherein the second housing is integrally formed.

According to the present disclosure, wherein the hooks are configured to hook on to the back surface of the flange.

According to the present disclosure, wherein the shutter plate is positioned between the vertical portions.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Figure 1:
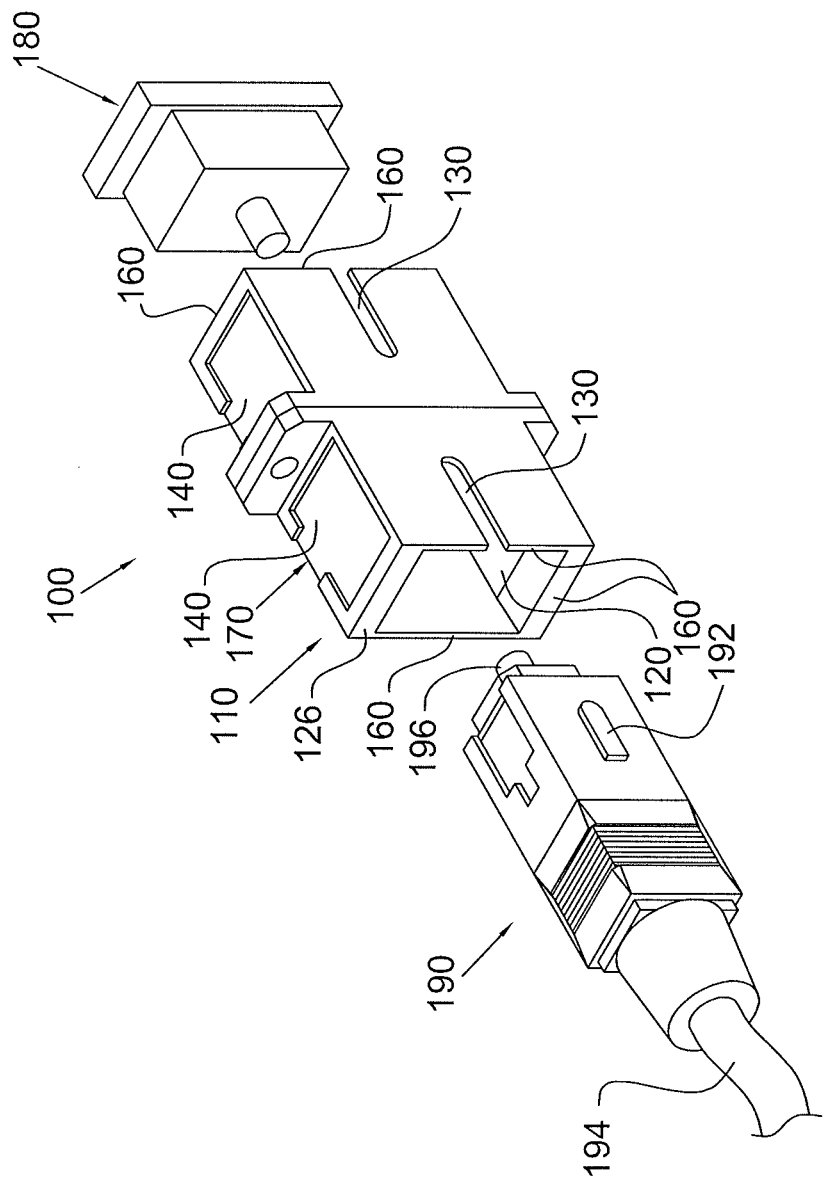
FIG. 1 is an elevated perspective view illustrating a conventional optical fiber adapter and a conventional optical fiber connector.
Figure 2:
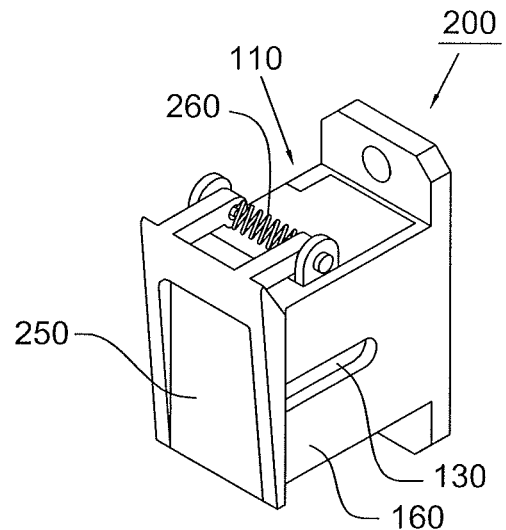
FIG. 2 is an elevated perspective view of a conventional optical fiber adapter with a cover for obstructing the light beams emitted from the receiving recess.
Figure 3:
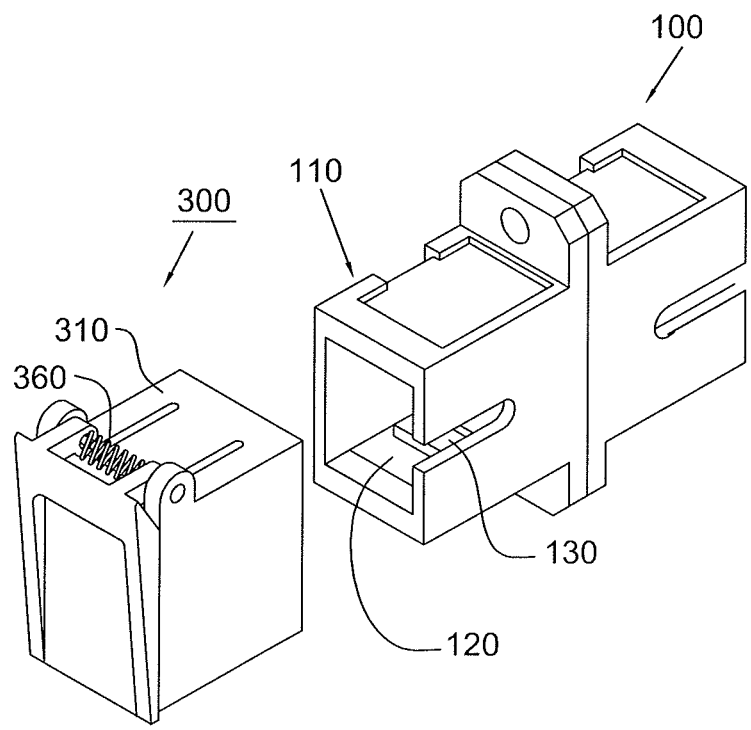
FIG. 3 is an elevated perspective view of a conventional protection cap for an optical fiber adapter.
Figure 4:
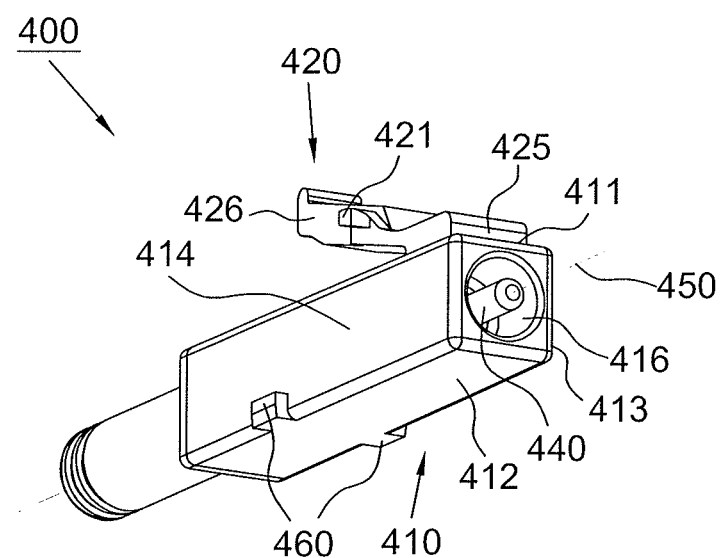
FIG. 4 is an elevated perspective view of a conventional LC type optical fiber connector.
Figure 5:
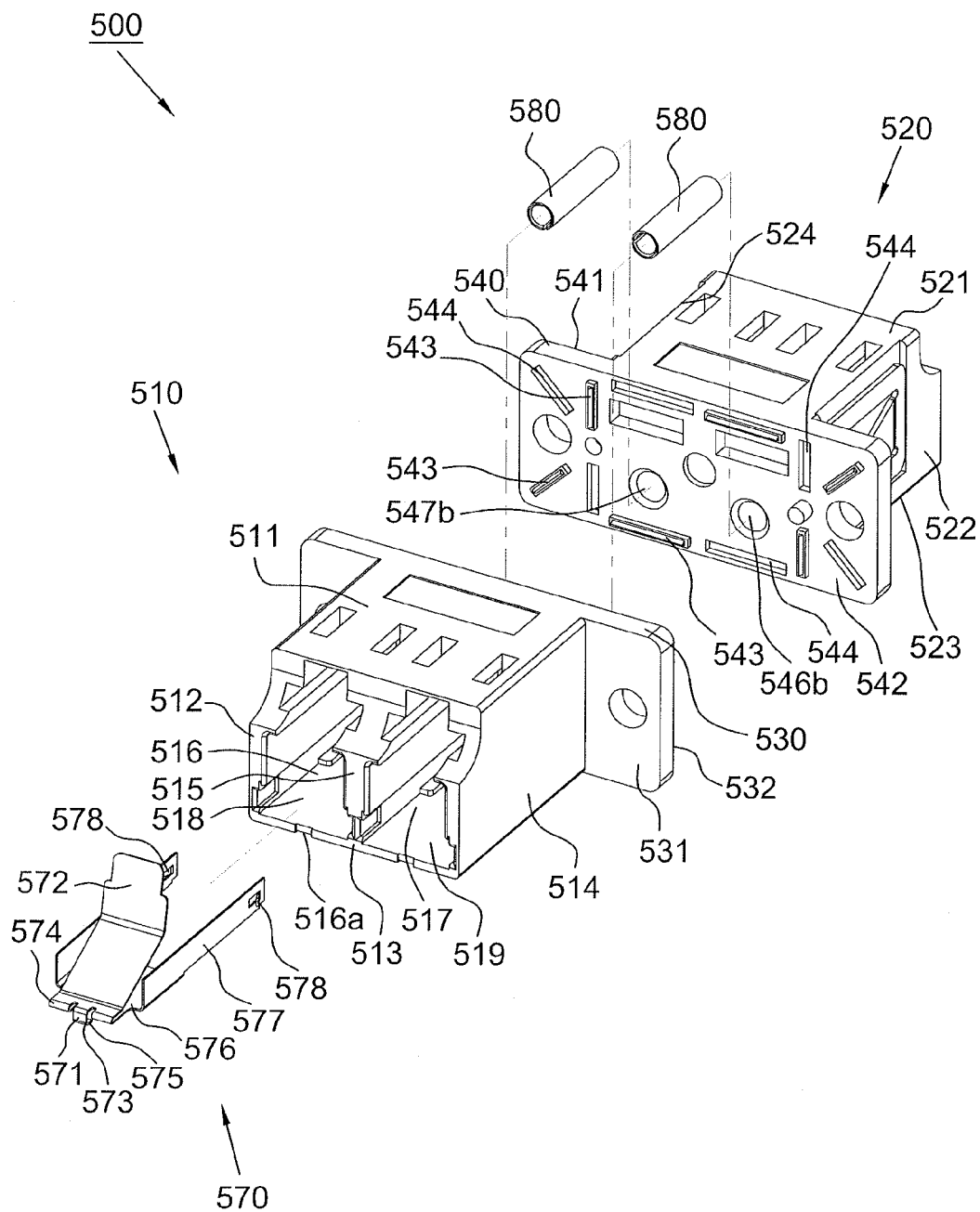
FIG. 5 is an exploded view of the optical fiber adapter of the present disclosure.
Figure 6A:
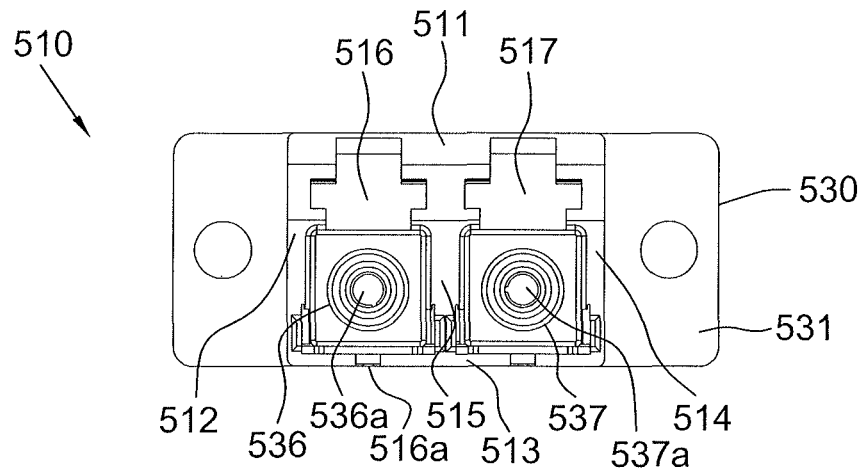
FIG. 6a is a front view of the first housing of the optical fiber adapter of the present disclosure.
Figure 6B:
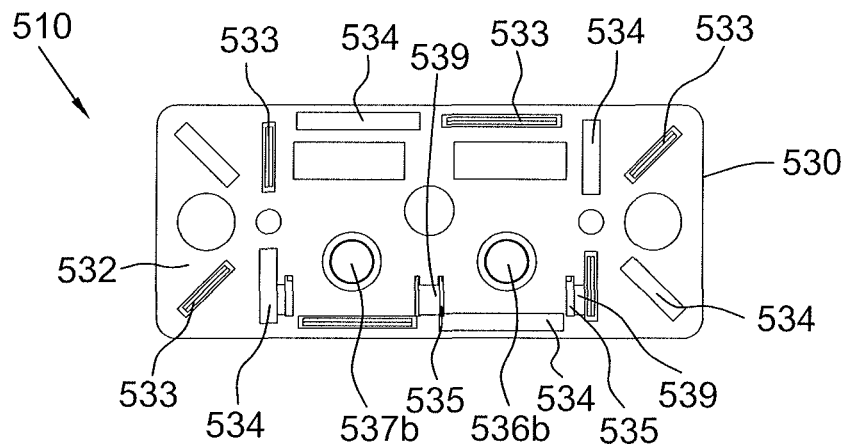
FIG. 6b is a rear view of the first housing of the optical fiber adapter of the present disclosure.
Figure 7:
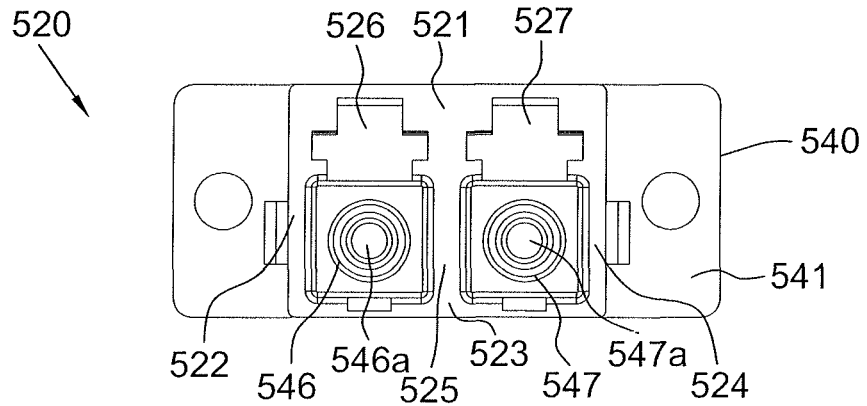
FIG. 7 is a front view of the second housing of the optical fiber adapter of the present disclosure.

Referring to FIG. 4, a conventional LC type optical fiber connector 400 has a generally rectangular shape with a square cross section. The connector 400 includes a rectangular hollow housing 410 comprised of a top side-wall 411, a bottom side-wall 412, a right side-wall 413 and a left side-wall 414, wherein the right side-wall 413 is opposite to the left side-wall 414 and connects with the bottom side-wall 412 and the top side-wall 411. A latch 420 is molded into the top side-wall 411 and includes a living hinge 425 which allows the tab 426 to be moved up and down in a direction perpendicular to the central axis 450-450 of the connector 400. The latch 420 also includes a pair of protrusions 421 that are positioned on opposing sides of the tab 426. In addition, a ferrule 440 protrudes from a circular opening 416 on the front end of the housing 410. A spring is located inside the housing 410 to allow the ferrule 440 to move back and forth through the opening 416 (not shown in the figure). A pair of protrusions 460 is positioned on the right side-wall 413 and left side-wall 414, respectively.

Referring to FIGS. 5, 6a, 6b and 7, the optical fiber adapter 500 according to the present disclosure includes a unitary molded plastic first housing 510, a unitary molded plastic second housing 520, an elastic shutter member 570 and two sleeves 580. The first housing 510 has a substantially rectangular flange 530 with opposing front surface 531 and back surface 532. A first wall 511, a second wall 512, a third wall 513 and a fourth wall 514 extend perpendicularly from the front surface 531 of the flange 530, wherein the first wall 511 faces the third wall 513 and connects with the second wall 512 and the fourth wall 514. In addition, a fifth wall 515 extends perpendicularly from the front surface 531 of the flange 530, wherein the fifth wall 515 is positioned between the second wall 512 and the fourth wall 514, and connects with the first wall 511 and the third wall 513. A first accommodation room 516 with an opening 518 is defined by the first, second, third and fifth walls 511, 512, 513, 515. A second accommodation room 517 with an opening 519 is defined by the first, fourth, third and fifth walls 511, 514, 513, 515. Two hollow cylinders 536, 537 extend perpendicularly from the front surface 531 of the flange 530, wherein the cylinder 536 has opposing openings 536a, 536b and is positioned within the first accommodation room 516, and the cylinder 537 has opposing openings 537a, 537b and is positioned within the second accommodation room 517. An indentation 516a is arranged on the third wall 513. The indentation 516a is formed at the exterior of the first accommodation room 516 and extends from the edge of the third wall 513.

The second housing 520 has a substantially rectangular flange 540 with opposing front surface 541 and back surface 542. A first wall 521, a second wall 522, a third wall 523 and a fourth wall 524 extend perpendicularly from the front surface 541 of the flange 540, wherein the first wall 521 faces the third wall 523 and connects with the second wall 522 and the fourth wall 524. In addition, a fifth wall 525 extends perpendicularly from the front surface 541 of the flange 540, wherein the fifth wall 525 is positioned between the second wall 522 and the fourth wall 524, and connects with the first wall 521 and the third wall 523. A first accommodation room 526 with an opening is defined by the first, second, third and fifth walls 521, 522, 523, 525. A second accommodation room 527 with an opening is defined by the first, fourth, third and fifth walls 521, 524, 523, 525. Two hollow cylinders 546, 547 extend perpendicularly from the front surface 541 of the flange 540, wherein the cylinder 546 has opposing openings 546a, 546b and is positioned within the first accommodation room 526, and the cylinder 547 has opposing openings 547a, 547b and is positioned within the second accommodation room 527.

The elastic shutter member 570 is integrally formed with metal. The shutter member 570 includes a shutter plate 572, a connecting portion 574, a horizontal portion 576, two vertical portions 577 and two hooks 578. The connecting portion 574 connects the horizontal portion 576 with the shutter plate 572 and is generally C-shaped. That is, the connecting portion 574 is curved and has a notch. The shutter plate 572 may contain a single plate or double plates. The shutter plate 572 may move with respect to the horizontal portion 576 and the angle between the above two elements is smaller than 90 degrees. The shutter plate 572 is moved close to the horizontal portion 576 with a push force and quickly moves back when the push is withdrawn. The vertical portions 577 are plate-like and extend upward from the edges of the opposing sides of the horizontal portion 576, respectively. The hooks 578 are plate-like and extend from the vertical portions 577, respectively. In addition, the shutter member 570 further includes a hook 571 extending from the connecting portion 574. The hook 571 is L-shaped and includes a vertical portion 573 extending downward from the connecting portion 574 and a horizontal portion 575 extending horizontally from the vertical portion 573 toward the connecting portion 574.

Figure 8:
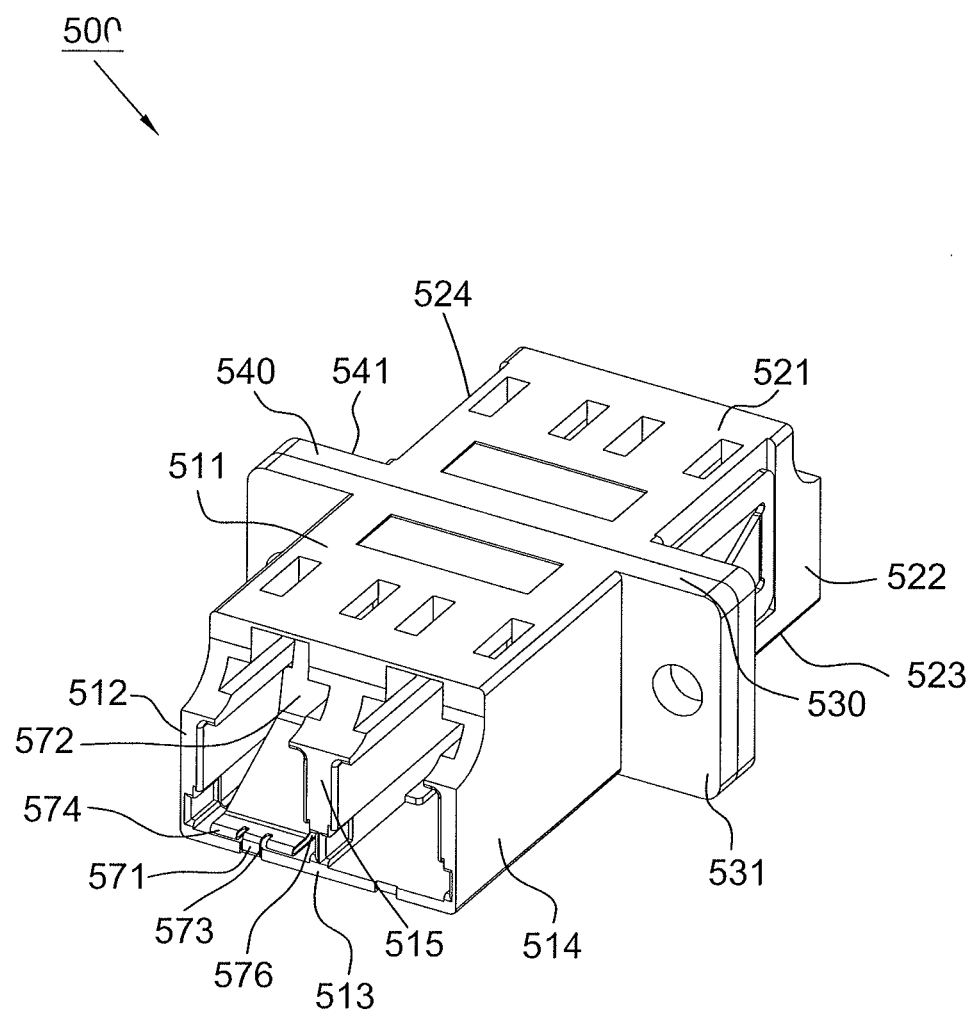
FIG. 8 is an elevated perspective view of the optical fiber adapter of the present disclosure.

When desiring to assemble the optical fiber adapter 500 of the present disclosure, one sleeve 580 is inserted into the cylinders 536 and 546, and the other sleeve 580 is inserted into the cylinders 537 and 547. Afterward, the housings 510 and 520 are combined together by attaching the back surfaces 532, 542 of the flanges 530, 540 to each other. The protrusions 533, 543 on the back surfaces 532, 542 of the flanges 530, 540 may be melted by ultrasonic wave and the melted protrusions 533, 543 are then placed in the corresponding indentations 544, 534 on the back surfaces 532, 542 of the flanges 530, 540. After the protrusions 533, 543 harden, the flanges 530 and 540 will be bonded together. Subsequently, the shutter member 570 is pushed into the accommodation room 516 through the opening 518 such that the hooks 578 are protruded from the opening 535 on the flange 530. FIG. 8 illustrates the assembled optical fiber adapter 500 of the present disclosure.

According to the optical fiber adapter 500 of the present disclosure, the horizontal portion 576 will be attached to the third wall 513 when the shutter member 570 is moved to being in place. Furthermore, the hooks 578 will hook on to the indentations 539 on the back surface 532 of the flange 530, respectively when a pull force is exerted on the shutter member 570. Consequently, the hooks 578 may prevent the shutter member 570 from being pulled out of the housing 510. In addition, the hook 571 will hook on to the third wall 513 of the housing 510. Specifically, the horizontal portion 575 of the hook 571 is in contact with the third wall 513. For example, the horizontal portion 575 is attached to the indentation 516a on the third wall 513. Therefore, when the connector 400 is inserted into the housing 510 to cause the elastic shutter plate 572 to be pushed down, the hook 571 may prevent the horizontal portion 576 and connecting portion 574 of the shutter member 570 from being levered up.

According to the optical fiber adapter 500 of the present disclosure, the shutter plate 572 will be located in front of the opening of the hollow cylinder 547 when the shutter member 570 is positioned in place. This way the light beams emitted from the cylinder 547 may be obstructed thereby preventing a user's eyes from exposure to the harmful light beams.

Figure 9:
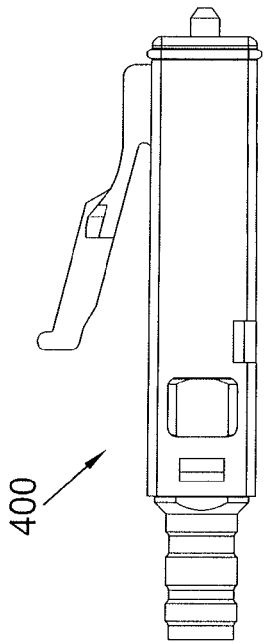
FIGS. 9 and 10 illustrate how to mate an optical fiber connector with the optical fiber adapter of the present disclosure.
Figure 9:
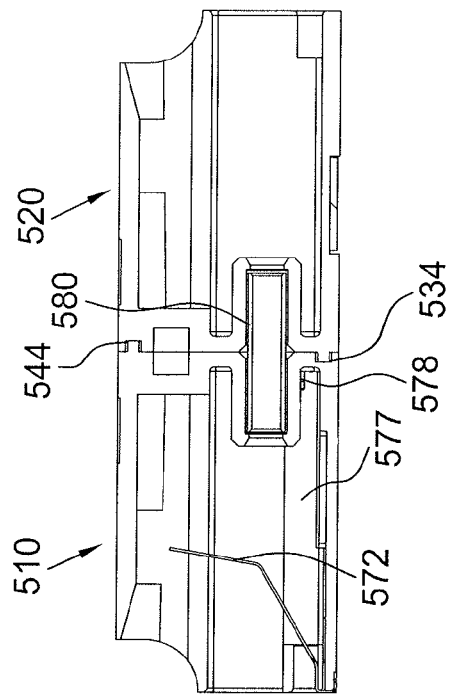
Figure 10:
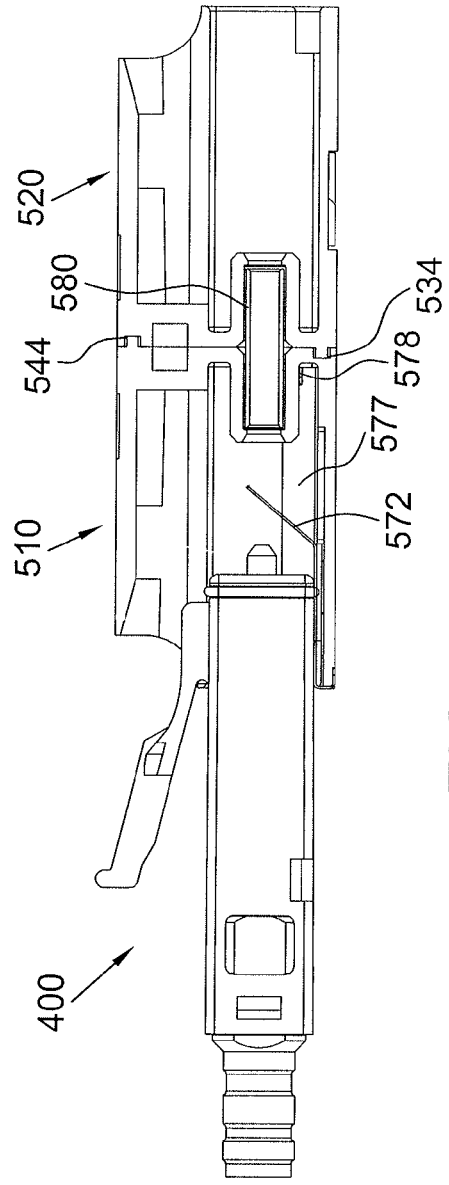

Referring to FIGS. 9 and 10, according to the optical fiber adapter 500 of the present disclosure, there is no need to detach the shutter member 570 from the housing 510 prior to inserting the optical fiber connector 400 into the accommodation room 516 of the housing 510. When the connector 400 is inserted into the accommodation room 516, it will push down the elastic shutter plate 572 to the gap between the connector 400 and the third wall 513 of the housing 510. Upon pulling out the connector 400, the elastic shutter plate 572 will quickly spring up to an original position to obstruct the light beams emitted from the cylinder 547 as a result of elasticity. As a result, the occurrence of exposure to the harmful light beams may be avoided.

Although the shutter member is installed in the first accommodation room as described in the present disclose, it will be appreciated that the shutter member may be arranged in either or both of the first and second accommodation rooms. In addition, it will also be appreciated that although the disclosure has been explained with the LC duplex adapter, the shutter member of the present disclosure may be used in LC simplex adapter, SC duplex adapter, SC simplex adapter, or other types of adapters.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter, comprising:
   a first housing, including:
      a flange having a front surface, a back surface opposing to the front surface and two openings extending through the flange from the front surface to the back surface, a first, second, third and fourth wall extending from the front surface, wherein the first wall faces the third wall and connects with the second and fourth walls, an accommodation room defined by the first, second, third and fourth walls, the accommodation room having an opening; and
      a hollow cylinder extending from the front surface of the flange and being positioned within the accommodation room; and
   an elastic shutter member, including:
      a horizontal portion positioned within the accommodation room and on the third wall;
      two vertical portions extending from two opposing sides of the horizontal portion, respectively and going through the openings on the flange, respectively;
      two hooks extending from the two vertical portions, respectively, wherein the hooks are configured to hook on to the flange;
      a shutter plate; and
      a connecting portion connecting the horizontal portion with the shutter plate;
      wherein the shutter plate extends from the connecting portion and into the accommodation room to arrive in front of an opening of the hollow cylinder.

2. The optical fiber adapter as claimed in claim 1, wherein two indentations are formed on the back surface of the flange, the hooks are configured to hook on to the indentations, respectively.

3. The optical fiber adapter as claimed in claim 1, wherein the hooks are plate-like.

4. The optical fiber adapter as claimed in claim 1, wherein the elastic shutter member further comprises another hook extending from the connecting portion to hook on to the third wall.

5. The optical fiber adapter as claimed in claim 1, wherein an indentation is formed on the third wall, the elastic shutter member further comprises another hook extending from the connecting portion to hook on to the indentation of the third wall.

6. The optical fiber adapter as claimed in claim 1, wherein the first housing is integrally formed.

7. The optical fiber adapter as claimed in claim 6, further comprising a second housing having a flange, a hollow cylinder extending from a front surface of the flange, and a plurality of walls extending from the front surface of the flange and surrounding the hollow cylinder, wherein a back surface of the flange of the second housing is attached to the back surface of the flange of the first housing.

8. The optical fiber adapter as claimed in claim 7, wherein the second housing is integrally formed.

9. The optical fiber adapter as claimed in claim 1, wherein the hooks are configured to hook on to the back surface of the flange.

10. The optical fiber adapter as claimed in claim 1, wherein the shutter plate is positioned between the vertical portions.

* * * * *